Patented Mar. 11, 1941

2,234,848

UNITED STATES PATENT OFFICE 2,234,848

TREATMENT OF RUBBER

William P. ter Horst, Packanack Lake, N. J., assignor, by mesne assignments, to United States Rubber Company, New York, N. Y., a corporation of New Jersey No Drawing. Application March 18, 1938,
Serial No. 196,705

12 Claims. (Cl. 260—791)

This invention relates to improvements in the production of vulcanized rubber goods and more particularly to a new class of vulcanization accelerators.

An object of the invention is to provide a class of chemicals having a desirable accelerating strength and which are comparatively non-discoloring as to the rubber. Other objects will be apparent from the following description.

According to the invention the rubber has incorporated therein prior to vulcanization in addition to sulphur or other vulcanizing agent, a reaction product of a ketone with ammonium thiocyanate which from analysis appears to be a tautomeric mercapto alkyl-substituted-dihydropyrimidine. It has been found that a substantially identical product may be produced by reacting a ketone with a thiourea, and for the purposes of the present invention such products having substantially identical properties are to be considered equivalents.

Typical among such products are, the reaction product of acetone and ammonium thiocyanate (M. P. 246–247° C.), which may also be made by the reaction of mesityl oxide and thiourea; the reaction product of methyl ethyl ketone with ammonium thiocyanate or thiourea (M. P. 228–230° C.); the reaction product of diacetone alcohol and mono-phenyl thiourea (M. P. 116–118° C.).

The mercapto alkyl dihydropyrimidines may be formed by the interaction of two moles of aliphatic ketone or the equivalent thereof, with one mole of ammonium thiocyanate or with one mole of thiourea or a mono-substituted thiourea, at temperatures ranging from room temperature up to about 150° C., the preferred bodies being those prepared by the use of acetone or methyl ethyl ketone. By the "equivalent" of two moles of aliphatic ketone I refer to the use of one mole of a condensed ketone, such as an alkylidene ketone, which may be formed by the condensation of one mole of a simple ketone with one or two moles of the same or a different ketone or of an aldehyde. The reactions by which the mercapto alkyl dihydro pyrimidines are formed are advantageously carried out in the presence of an excess of the ketone.

For the production of other compounds resulting from the reaction of a ketone with ammonium thiocyanate or an unsubstituted or substituted thiourea (as by an aromatic or alkyl group, e. g. phenyl, methyl, ethyl, etc.), the ketones mentioned above may be replaced by any of the following ketones: mesityl oxide, phorone, diacetone alcohol, diethyl ketone, dipropyl ketone, methyl propyl ketone, methyl isopropyl ketone, methyl butyl ketone, methyl isobutyl ketone, di-iso-butyl ketone, acetyl acetone, acetonyl acetone, methyl amyl ketone, methyl-hexyl-ketone, diacetone-amine, ethylidene-acetone, mono-hydroxy acetone, dihydroxy-acetone, methyl beta-hydroxyethyl ketone, methyl gamma-hydroxy-propylketone, etc.

As indicated, thiourea may be replaced by mono-phenyl-thiourea, methyl thiourea, or ethyl thiourea, and any of these reacted with any of the above ketones.

The following examples are given to illustrate preferred embodiments of the invention, the parts being by weight:

*Example 1.*—At least two molecular proportions of acetone and 1 molecular proportion of ammonium thiocyanate are heated under reflux or in an autoclave under pressure, for 24 hours or longer whereby the reagents condense with elimination of water. Afterwards water is added to the reaction mass whereupon crystals separate which may be purified by washing and drying, having then a melting point of 246–247° C. The material is denoted 2-mercapto-4-methyl-6-dimethyl-dihydropyrimidine. The probable course of the reaction is

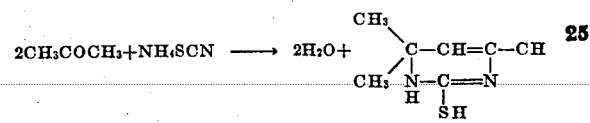

or

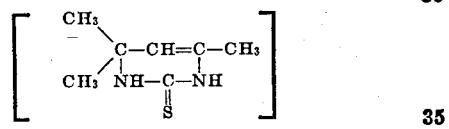

The corresponding methyl ethyl ketone-ammonium thiocyanate product is denoted 2-mercapto - 4,6 - diethyl-6-methyl - dihydropyrimidine and may be prepared as shown in Example 5 below.

*Example 2.*—A mixture of 18 parts of ammonium thiocyanate and 25 parts of mesityl oxide, are heated for 8 hrs. at approximately 150° C. under pressure. Thereafter the reaction mass is cooled and poured into water to remove unreacted ammonium thiocyanate, and the desired water-insoluble solid material is filtered off (M. P. 228° C., unpurified).

*Example 3.*—985 parts of thiourea and 1300 parts mesityl oxide are heated under reflux during 24 hrs. after which unreacted mesityl oxide is removed by distillation. The residue is treated with water to remove unreacted thiourea. The desired water-insoluble material has a melting point of 233–234° C.

*Example 4.*—25 grams mesityl oxide, 20 grams thiourea, 50 c. c. 95% alcohol and 2 c. c. concentrated hydrochloric acid are heated under reflux during 60 hrs. The clear solution is poured onto 100 grams ice and 100 grams water. The desired insoluble material is filtered off, washed and dried (M. P. 249.5° C.).

*Example 5.*—250 parts of ammonium thiocyanate and 500 parts of methyl ethyl ketone are heated under reflux (approximately 80.5° C.) during 24 hours. The unreacted methyl ethyl ketone is removed by distillation and the residue mixed with 1000 parts of water thereby segregating about 143 parts of water-insoluble material (M. P. 228–229° C.). Better yields may be obtained by extending the reaction time to 72 hours.

*Example 6.*—100 parts of ammonium thiocyanate are mixed with 200 parts of acetyl acetone. The reaction is exothermic and the reaction mix is allowed to stand at room temperature during 72 hours. Thereafter the reaction product is treated with about 100 parts of water, giving a water-insoluble material which is a purple colored, crystalline material (M. P. 170–177° C.).

*Example 7.*—100 parts of monophenyl thiourea and 200 parts of diacetone alcohol are heated under reflux during 24 hours, and the reaction mix then treated with 1000 parts of water, yielding about 65 parts of water-insoluble solid material (M. P. 116°–118° C.).

The tables below indicate the accelerating properties of various of the reaction products when tested out in the base stocks described, in comparison with a well known accelerator, diphenylguanidine (D. P. G.). T is tensile in pounds per square inch at break and E, percent elongation at break.

Table I

Base stock: pale crepe 100; zinc oxide 10; sulfur 3; stearic acid 2 (parts by weight)

| Minutes cure at 45 lbs./sq. in. steam pressure | .75 part D. P. G. | | .75 pt. Ex. 1 r. pr. | | .75 pt. Ex. 5 r. pr. | | 1.5 pt. Ex. 5 r. pr. | | .75 pt. Ex. 6 r. pr. | |
|---|---|---|---|---|---|---|---|---|---|---|
| | T | E | T | E | T | E | T | E | T | E |
| 30 | 2467 | 800 | 3495 | 800 | 2792 | 760 | 3218 | 700 | 2133 | 860 |
| 60 | 3306 | 760 | 3367 | 760 | 2941 | 730 | 3117 | 700 | 2306 | 800 |

| | | T-50 test | | | | | | | | |
|---|---|---|---|---|---|---|---|---|---|---|
| 30 | +3.7 | −3.0 | | −3.2 | | −9.2 | | +4.0 | | |
| 60 | −9.5 | −14.5 | | −14.8 | | −20.5 | | −7.2 | | |

Table II

Base stock: smoked sheet 100; carbon black 45; zinc oxide 5; pine tar 2; stearic acid 4; sulfur 3

| Minutes cure at 50 lbs./sq. in. steam pressure | 1.5 pt. D. P. G. | | 1 pt. Ex. 1 r. pr. | | 1.5 pt. Ex. 1 r. pr. | | 1.5 pt. Ex. 5 r. pr. | | 1.5 pt. Ex. 7 r. pr. | |
|---|---|---|---|---|---|---|---|---|---|---|
| | T | E | T | E | T | E | T | E | T | E |
| 30 | 4000 | 480 | 3158 | 380 | 3638 | 390 | 3736 | 510 | 3826 | 550 |
| 50 | 3516 | 360 | 3393 | 390 | 3354 | 350 | 2562 | 390 | 3881 | 560 |
| 70 | 3538 | 390 | 3674 | 460 | 3150 | 350 | overcured | | 3462 | 530 |

| | | T-50 test | | | | | | | | |
|---|---|---|---|---|---|---|---|---|---|---|
| 30 | −1.6 | −4.6 | | −6.7 | | −13.4 | | −5.3 | | |
| 50 | −10.8 | −13.0 | | −15.5 | | Broke overcured | | −12.0 | | |
| 70 | −18.0 | −17.6 | | −18.9 | | Broke overcured | | −15.5 | | |

*Example 8.*—40 pts. of ammonium thiocyanate and 100 pts. of diethyl ketone are heated under reflux during 72 hrs. and the reaction mix then treated with water, yielding about 15 pts. of water-insoluble pasty material.

*Example 9.*—As in Example 8, using 40 pts. of ammonium thiocyanate and 120 pts. methyl-isopropylketone yielding about 10 pts. of water-insoluble material, a thick paste.

*Example 10.*—As in Example 8, using 40 pts. of ammonium thiocyanate and 120 pts. of methyl-iso-butyl ketone yielding about 25 pts. of water-insoluble, solid material, M. P. approximately 121° C.

*Example 11.*—As in Example 8, using 40 pts. of ammonium thiocyanate and 120 pts. of methyl propyl ketone treated under reflux during 240 hrs. and yielding about 40 pts. of water-insoluble, solid material, M. P. of the crude product 115–127° C.

*Example 12.*—As in Example 8, using 76 pts. of ammonium thiocyanate and 250 pts. of methyl amyl ketone yielding about 58 pts. of water-insoluble oily reaction product.

*Example 13.*—As in Example 8, using 76 pts. of ammonium thiocyanate and 275 pts. of methyl hexyl ketone and yielding about 611 pts. of water-insoluble oily reaction product.

For testing purposes there was used a base stock: pale crepe 100; zinc oxide 10; sulfur 3; stearic acid 2. To this stock was added accelerator in the amounts shown in table below:

Table III

| Minutes cure at 40 lbs. sq. in. steam pressure | .75 pt. Ex. 8 r. pr. | | 1.0 pt. Ex. 9 r. pr. | | .75 pt. Ex. 10 r. pr. | | .75 pt. Ex. 11 r. pr. | | .75 pt. Ex. 12 r. pr. | | .75 pt. Ex. 13 r. pr. | |
|---|---|---|---|---|---|---|---|---|---|---|---|---|
| | T | E | T | E | T | E | T | E | T | E | T | E |
| 30 | 2876 | 810 | 4211 | 780 | 3336 | 770 | 3666 | 740 | 3845 | 850 | 3097 | 840 |
| 60 | 3313 | 800 | 4043 | 740 | 2464 | 690 | 3856 | 700 | 3380 | 750 | 3129 | 800 |

The reaction products besides being useable as primary accelerator materials, may be used also as activating or secondary accelerators for primary organic accelerators which ordinarily respond to activation by basic organic amines during the final cure. For example, the acetone-ammonium thiocyanate reaction product has strong activating properties on accelerating mercaptothiazoles such as mercaptobenzothiazoles. This is further illustrated by the following:

*Example 14.*—The reaction product of methyl ethyl ketone and ammonium thiocyanate, and the reaction product of acetone and ammonium thiocyanate referred to respectively as products A and B below in the table were also tested as activators for mercaptobenzothiazole disulphide known as Altax, in an ammonia cured footwear stock comprising rubber 100, zinc oxide 8.5, stearic acid 1.25, zinc laurate 0.50, sulphur 1.46, Altax 0.50, together with fillers and pigments. Comparison was also made with a similar stock activated with diorthotolylguanidine (D. O. T. G.). Curing was carried out as follows: 50 min. rise to 255° F. and then held for 15 min. to 75 min. at 255° F. under 25 lbs. per sq. in. of air and 5 lbs. per sq. in. of ammonia pressure. The air was introduced as soon as the vulcanizer was closed, the ammonia was introduced when the temperature reached 245° F.

TABLE IV

| Minutes cure at 255° F. | A using .13 pt. D. O. T. G. | | B using .13 pt. product A | | C using .13 pt. product B | | D using .20 pt. D. O. T. G. | | E using .20 pt. product A | | F using .20 pt. product B | |
|---|---|---|---|---|---|---|---|---|---|---|---|---|
| 15 | 540 | 733 | 900 | 725 | 1000 | 726 | 480 | 696 | 1440 | 723 | 1580 | 726 |
| 45 | 1600 | 698 | 2040 | 710 | 2030 | 700 | 2030 | 703 | 2400 | 700 | 2400 | 700 |
| 75 | 2150 | 663 | 2340 | 700 | 2230 | 700 | 2460 | 666 | 2360 | 686 | 2400 | 696 |

Some of the materials such as the acetonyl acetone-ammonium thiocyanate reaction product may also be used as a softener for rubber as where it is milled at 300° F. in the absence of other ingredients.

In the preparing the chemicals, the time and temperature of the reaction and the amount of reactants may be varied, as is found suitable. Also a catalyst may or may not be used as desired, to regulate the reaction; dehydrating agents may be added to facilitate the elimination of water during the reaction.

The term "rubber" is to be construed broadly as including caoutchouc, gutta percha, balata, reclaim, as well as other related gums or rubber-like materials including synthetic rubbers, rubber isomers, etc., and the naturally-occurring or artificially prepared latices thereof.

Other compounding ingredients including anti-oxidants, and other softeners and pigments, etc. may be used in conjunction with the herein referred to chemicals, in the manufacture of a large variety of rubber goods.

Although certain concepts relative to the constitution of the materials has been given, it is to be understood that the invention contemplates the use of the accelerators whatever their actual constitution, and it is not desired to limit the invention otherwise than as set forth in the appended claims.

Having thus described my invention, what I claim and desire to protect by Letters Patent is:

1. A process of treating rubber which comprises incorporating in rubber prior to vulcanization a 2-mercapto alkyl-substituted dihydropyrimidine.

2. A process of treating rubber which comprises incorporating in rubber prior to vulcanization a product of reaction of at least two molecular proportions of an aliphatic ketone with one molecular proportion of ammonium thiocyanate.

3. A process of treating rubber which comprises incorporating in rubber prior to vulcanization a product of reaction of at least two molecular proportions of an aliphatic ketone with one molecular proportion of a thiourea.

4. A process of treating rubber which comprises incorporating in rubber prior to vulcanization a product of reaction of at least two moles of acetone with one mole of ammonium thiocyanate.

5. A process of treating rubber which comprises incorporating in rubber prior to vulcanization a product of reaction of at least two molecular proportions of methyl ethyl ketone and one molecular proportion of ammonium thiocyanate.

6. A process of treating rubber which comprises incorporating in rubber prior to vulcanization a product of reaction of at least one molecular proportion of mesityl oxide with one molecular proportion of thiourea.

7. A rubber composition containing a 2-mercapto alkyl-substituted dihydropyrimidine.

8. A rubber composition containing a product of reaction of at least two molecular proportions of an aliphatic ketone with one molecular proportion of ammonium thiocyanate.

9. A rubber composition containing a product of reaction of at least two molecular proportions of an aliphatic ketone with one molecular proportion of a thiourea.

10. A rubber composition containing a product of reaction of at least two moles of acetone with one mole of ammonium thiocyanate.

11. A rubber composition containing a product of reaction of at least two molecular proportions of methyl ethyl ketone and one molecular proportion of ammonium thiocyanate.

12. A rubber composition containing a product of reaction of at least one molecular proportion of mesityl oxide with one molecular proportion of thiourea.

WILLIAM P. TER HORST.

CERTIFICATE OF CORRECTION.

Patent No. 2,234,848. March 11, 1941.

WILLIAM P. ter HORST.

It is hereby certified that error appears in the printed specification of the above numbered patent requiring correction as follows: Page 1, second column, line 26, in the extreme right-hand portion of the formula, for "CH" read --CH$_3$--; page 2, first column, line 13, for "acetyl" read --acetonyl--; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.